June 5, 1923.
A. URBANIK
CUTTING IMPLEMENT
Filed Nov. 2, 1922
1,457,643
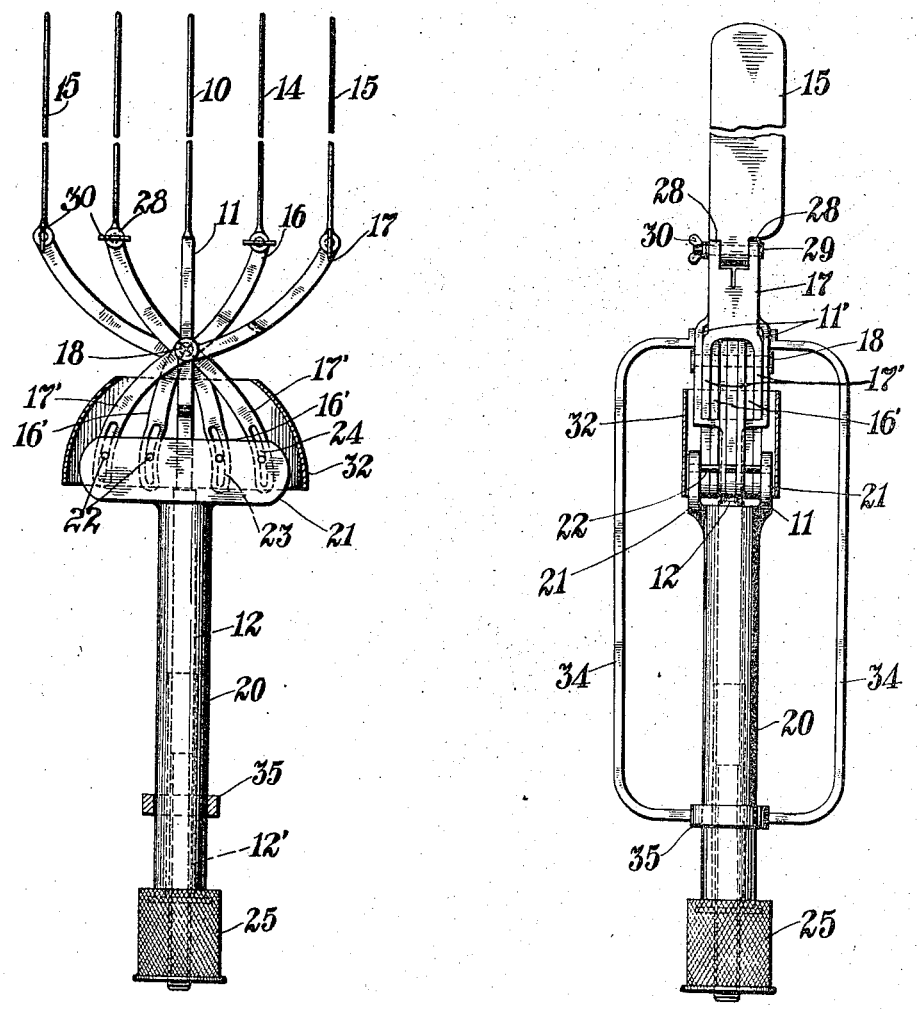
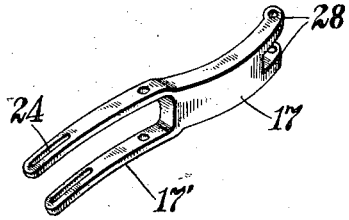
Inventor
Andrew Urbanik.
By
Attorney Patented June 5, 1923.

1,457,643

UNITED STATES PATENT OFFICE.

ANDREW URBANIK, OF CENTRAL FALLS, RHODE ISLAND.

CUTTING IMPLEMENT.

Application filed November 2, 1922. Serial No. 598,483.

*To all whom it may concern:*

Be it known that I, ANDREW URBANIK, a citizen of the United States, residing at Central Falls, in the county of Providence and State of Rhode Island, have invented certain new and useful Improvements in Cutting Implements, of which the following is a specification.

This invention relates to a cutting implement adapted for use in slicing bread or the like, the invention having for an object the provision of a simple form of implement adapted to cut a number of slices at a single stroke, a further object relating to the provision of means for cutting slices of varying thickness.

For further comprehension of the invention, and of the objects and advantages thereof, reference will be had to the following description and accompanying drawings, and to the appended claims in which the various novel features of the invention are more particularly set forth.

Fig. 1 of the drawings is a side elevational view, with parts in section, showing my improved cutting implement.

Fig. 2 is a side elevation at right angles to Fig. 1.

Fig. 3 is a detail perspective view of one of the blade holders.

Briefly speaking my improved cutting implement comprises a plurality of knives arranged side by side, the central knife being fixed with relation to the handle while the other ones are adjustable toward and away from the said central knife.

The central knife comprises a blade 10 fixed on a haft 11 which projects longitudinally from one end of a rod 12, the haft being formed to present a rectangular frame element 11' to which the other knives are pivoted. In the present instance I have shown five knives in all, the intermediate knives being numbered 14 and the outer ones 15, the intermediate knives being mounted on arms 16, and the outer knives on arms 17, these arms being all pivoted on a pin 18 fixed at its ends in the frame 11', the arms being forked to straddle one another as will be understood.

These arms cross each other at their pivotal point and have rearward extensions 16' and 17' adapted to be engaged by an adjusting device. This adjusting device comprises a sleeve 20 freely surrounding the rod 12 and having at one end a pair of spaced crosspieces 21 which extend across the rear ends of the elements 16', 17' and carry fixed pins 22 engaging in longitudinal cam slots 23, 24 in said elements. These slots are preferably so formed that when the sleeve 20 is moved longitudinally on the rod 12 the engagement of the pins 22 with the respective slots will act to keep the knives at all times all equidistant from one another.

To move the sleeve 20 along the rod 12 the latter has a threaded portion 12' which is engaged by an interiorly threaded barrel 25 swiveled in any suitable manner on the rear end of the sleeve so as to move the latter along the rod as the barrel is rotated on the threaded portion of the said rod.

The knives 14, 15 are connected to their supporting arms 16, 17 by being engaged between lugs such as 28 projecting longitudinally therefrom, headed pins 29 being passed through suitable registering apertures in the knife-ends and the lugs 28 and having threaded ends on which are nuts 30 adapted to clamp the knives to the arms.

A casing 32 may be secured to the frame 11' and cover the arm extensions 16', 17', while a pair of rods 34 may be connected at one end to the frame 11' and at opposite ends to a ring 35 surrounding the sleeve 20 to serve as handles for manipulating the implement.

Having thus described my invention what I claim as new and desire to protect by Letters Patent of the United States is as follows:

1. A cutting implement comprising a number of pivoted blades arranged side by side, rigid extensions from said blades formed with cam elements, and reciprocable members adapted to engage said cam elements to swing said blades in unison on their pivot points.

2. A cutting implement comprising a number of pivoted blades arranged side by side, rigid extensions from said blades formed with cam elements, and reciprocable members adapted to engage said cam elements to swing said blades in unison on their pivot points, while maintaining them equidistant from one another.

3. A cutting implement comprising an odd number of blades arranged side by side, the central blade being fixed, and cam means for adjusting the side blades toward and away from the central blade.

4. A cutting implement comprising an odd number of blades arranged side by side, the central blade being fixed, and means for adjusting the side blades toward and away from the central blade, said means being adapted to maintain the blades equidistant from one another and to hold said blades rigidly against other than unitary movement.

5. A cutting implement comprising a rod having a knife fixed to one end thereof, a series of arms pivoted to the haft of said knife and having rearward extensions formed with cam slots knives mounted on said arms, a sleeve slidable on said rod and having a crosspiece at one end, pins on said crosspiece adapted to engage said cam slots, and means for moving said sleeve along said rod.

6. A cutting implement comprising a rod having a knife fixed to one end thereof, a series of arms pivoted to the haft of said knife and having rearward extensions formed with cam slots knives mounted on said arms, a sleeve slidable on said rod and having a crosspiece at one end, pins on said crosspiece adapted to engage said cam slots, and means for moving said sleeve along said rod, said means comprising a barrel having a swivel engagement with said sleeve and a screw-thread engagement with said rod.

In testimony whereof I have affixed my signature.

ANDREW URBANIK.